June 4, 1968 E. MOORE 3,386,484
QUICK DEMOUNTABLE TIRE CHAIN ASSEMBLY
Filed Dec. 21, 1965
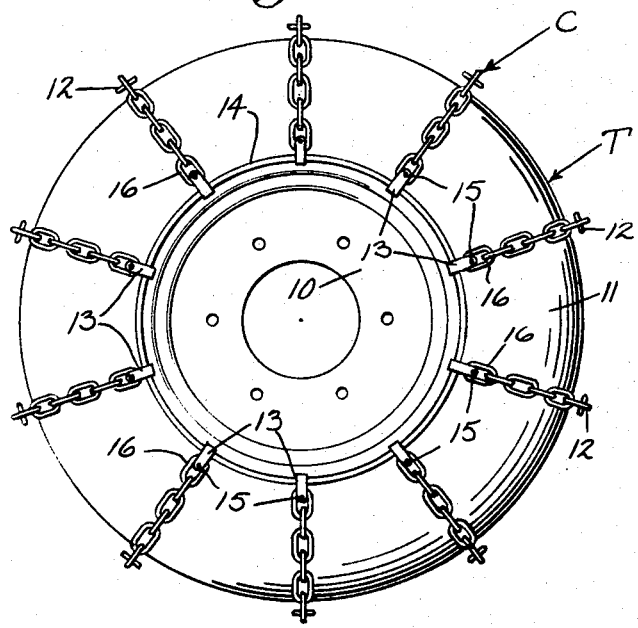
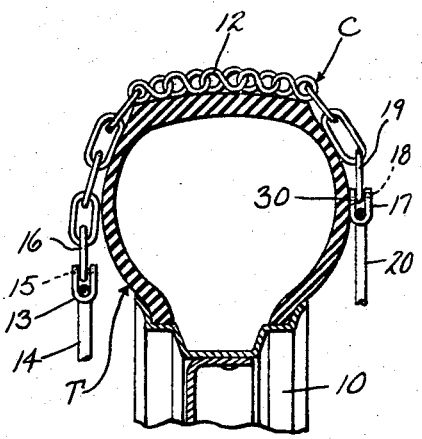
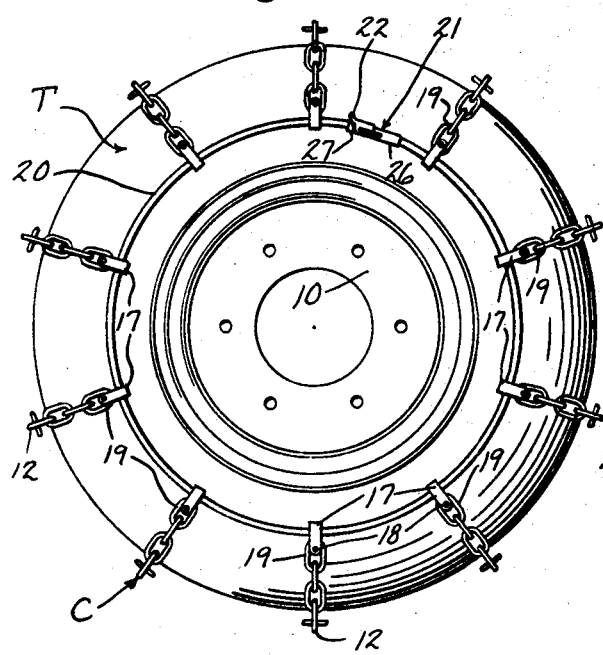
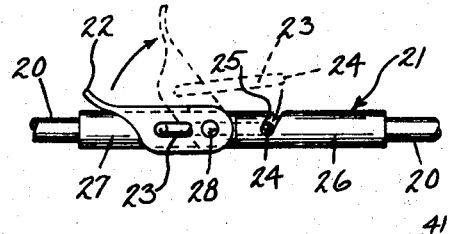
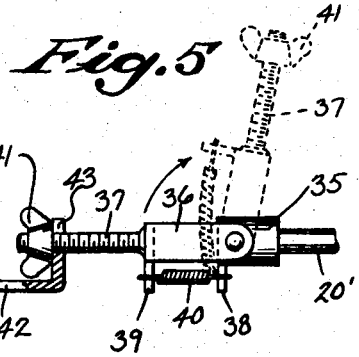
INVENTOR
EDDIE MOORE
BY
GEORGE W. WRIGHT, JR.

United States Patent Office 3,386,484
Patented June 4, 1968

3,386,484
QUICK DEMOUNTABLE TIRE CHAIN
ASSEMBLY
Eddie Moore, 5225 W. Stark St.,
Milwaukee, Wis. 53218
Filed Dec. 21, 1965, Ser. No. 515,340
1 Claim. (Cl. 152—242)

ABSTRACT OF THE DISCLOSURE

An apparatus providing a quick demountable type tire chain assembly for vehicles having an inner and outer ring lying adjacent the tire, the inner ring being of a larger circumference than the outer ring and the inner ring having a detachable latching member to provide for the quick assembly of the tire chains on the tire, the cross links being secured to each ring by means of a U-shaped strap welded in spaced relationship about the rings and a removable pin secured across the entrance throat of the strap so that cross-links may be replaced and repaired when needed.

---

This invention relates to improvements in tire chain assemblies, and more particularly to new and useful improvements in a quick demountable type of tire chain assembly. In the past many means have been provided for chains to be quickly and easily attached to tires but heretofore to my knowledge all types of demountable tire chain assemblies have been either complicated to use or require certain adjuncts and attachments to the tire rims per se. There has long been a need therefore for a quick demountable type wherein no adjuncts are required and wherein the chains may be quickly secured to the tires.

It is therefore a primary object of my present invention to provide a quick demountable type of tire chain assembly wherein the assembly may be quickly and easily placed around the tire without the necessity of securing the chains in any manner to the wheel or hub assembly.

Another important object of my present invention is to provide a tire chain assembly which will effectively convert the tire for use on ice or snow and which can be easily and expeditiously attached to the tire by an ordinary layman.

A salient feature of my invention resides in providing a tire chain assembly where chain cross links are secured to a ring and wherein an additional ring is provided on the inside of the chain which can be quickly and easily attached and detached as desired.

A further object of my present invention is to provide a demountable type of tire chain assembly wherein a smaller outside ring is provided to which are attached a plurality of tire cross links, the inside ring being open and being provided with a novel latch assembly so that the inside ring may be spread to easily place the tire chain about the tires and then lock the same firmly thereto.

A further object of my invention is to provide a simple, practical and reliable construction that is economical to manufacture, easy to assemble and positive in its operation.

With the above and other objects in view, which will more readily appear as the nature of the invention is better understood, the same consists in the novel construction combination and arrangement of parts hereinafter more fully described, illustrated and claimed.

A preferred and practical embodiment of the invention is shown in the accompanying drawing, in which:

FIGURE 1 is a side elevational view of the outside of a tire and wheel assembly showing my novel tire chain assembly attached thereto;

FIGURE 2 is an elevational view of the inside of a tire and wheel assembly showing how my novel tire chain assembly may be easily and quickly secured to the tire;

FIGURE 3 is a transverse section through the wheel and my novel tire chain assembly;

FIGURE 4 is an enlarged fragmentary view of one of the means for locking the inner ring securely in place the latch member being shown in its locked position in full lines and its open position in dotted lines, and FIGURE 5 is an enlarged fragmentary view similar to FIGURE 4 of the drawing but illustrating a modified form of locking the inner ring in place, certain parts being broken away and in section to illustrate further details in its construction.

Referring now to the drawing in detail wherein similar reference characters designate corresponding parts throughout the several views, the letter C generally indicates one type of my improved quick demountable tire chain assembly and it is shown secured to a tire and wheel assembly T.

The tire and wheel assembly T forms no particular part of the present invention but for purposes of description, the same includes broadly the wheel assembly 10 and a tire 11.

My novel tire chain assembly includes broadly cross chain members 12 which are secured by means of straps 13 to a ring 14. Ring 14 is the outer ring and is of a size and configuration to conform generally to the outer circumference of the wheel 10. While any number of cross links 12 may be utilized, I prefer to use ten since this number has been found to be most effective for use in snow and ice. As mentioned, I utilize straps 13 which are spot welded or otherwise secured to the ring 14 and these straps are provided with removable cross pins 15 over which a link 16 of the cross links 12 is secured. The other end of cross links 12 is likewise secured to U-shaped straps 17 also provided with cross pins 18 fitting link 19 and these straps 17 are likewise spot welded to inner ring 20. This ring 20 is of a larger circumference than outer ring 14 and is also provided with a latch member 21 so that the ring 20 may be parted to remove or replace the entire assembly C.

In that form of the invention shown and described in FIGURES 1-4 inclusive, latch member 21 includes a pivoted latch 22 which pivotally carries a latch ring member 23 having a U-shaped shank portion 24 adapted to fit in a groove 25 (FIGURE 4) formed in an enlarged end portion 26 of ring 20. Latch member 22 may be pivoted to enlarge portion 27 of the other end of the inner ring 20 as shown and indicated by the reference numeral 28.

Thus in the form of the invention described, the entire tire chain assembly can be quickly secured to the tire by merely placing outer ring 14 adjacent the outer wheel portion or hub cap (not shown) and bringing the inner ring around the inside 30 of the tire placing the link 23 in groove 25 and moving the latch from its dotted line position (FIGURE 4) to its full line position whereby the entire assembly is now securely placed about the tire.

Attention is now directed to FIGURE 5 of the drawing wherein a modified form of latch member is disclosed. In this form of latch member an adjustment of inner ring 20' may be had and one end 35 is provided with a U-shaped swingable member 36 to which is affixed a threaded shank 37. Member 35 is also provided with a depending ear 38 and the swingable member 36 is provided with a mating ear 39 to which is attached a spring 40, tensioned so as to hold the swingable member 36 and the threaded shank 37 in the full line position of FIGURE 5. On the outer end of the threaded shank 37, I provide a wing nut 41. The other end of the inner ring 20' is provided with a U-shaped holding member 42, the outer wall of which is provided with a slot 43 of a size and configuration to receive the threaded shank 37. Thus in order to utilize the novel latching assembly shown in FIGURE 5 of the drawing, it is only necessary to adjust the wing nut 41 so that the shank 37 is received in slot 43, then wing nut may be tightened until the entire ring 20 is drawn to its closed position to firmly lock the entire assembly in place.

Thus I have described and shown a device that is easily and quickly attached to a tire and while I have shown and described certain specific embodiments of my invention, it will be understood that these embodiments are merely for the purpose of illustration and description, that various other forms may be devised and that changes may be made in the proportions and minor details of construction without departing from the spirit of the invention or the scope of the appended claim.

I claim:

1. In a tire chain assembly a plurality of cross-links each secured to an outer ring, said outer ring being of a size and configuration to fit about the rim of said tire, an inner ring, each cross-link being secured to said inner ring, said inner ring being of a larger circumference than said outer ring, and a latch assembly for said inner ring to provide a locked position wherein said inner ring is solid and an open position wherein said inner ring may be parted, said latch member including, a threaded shank pivoted at one end to said inner rim, a U-shaped member on the other end of said ring opposite said threaded shank, a leg of said U-shaped member having an open slot of a size and configuration to receive a respective portion of said threaded shank, a wing nut threadedly secured to the outer end termination of said shank, a spring having one end carried by said threaded shank intermediate its pivot point and its outer end termination and having its other end carried by said respective ring portion, said spring constantly urging said shank into the slot, a series of spaced U-shaped straps spot welded to each respective ring, a removable pin of each strap member adapted to receive a respective link of said cross-links, whereby the entire assembly can be easily and quickly placed on and removed from a tire.

References Cited
UNITED STATES PATENTS

| | | | |
|---|---|---|---|
| 2,625,976 | 1/1953 | Reynolds | 152—242 |
| 2,493,994 | 1/1950 | Newman | 152—242 |
| 2,332,113 | 10/1943 | Reed | 152—241 |
| 2,204,783 | 6/1940 | Wettlavfer | 152—242 |
| 1,424,347 | 8/1922 | Evans | 152—242 |
| 1,256,538 | 2/1918 | Eichner | 152—242 |

ARTHUR L. LA POINT, *Primary Examiner.*

R. A. BERTSCH, *Assistant Examiner.*